(12) United States Patent
Lerner

(10) Patent No.: US 6,199,349 B1
(45) Date of Patent: Mar. 13, 2001

(54) DUNNAGE MATERIAL AND PROCESS

(75) Inventor: Bernard Lerner, Aurora, OH (US)

(73) Assignee: Automated Packaging Systems, Inc., Streetsboro, OH (US)

(*) Notice: Subject to any disclaimer, the term of this patent is extended or adjusted under 35 U.S.C. 154(b) by 0 days.

(21) Appl. No.: 09/315,413

(22) Filed: May 20, 1999

(51) Int. Cl.$^7$ .................................................. B65B 23/00
(52) U.S. Cl. ............................... 53/472; 53/469; 53/468; 53/567
(58) Field of Search .............................. 53/472, 469, 468, 53/567, 385.1; 493/967, 239; 206/522, 390, 820

(56) References Cited

U.S. PATENT DOCUMENTS

| | | |
|---|---|---|
| 3,254,828 | 6/1966 | Lerner . |
| 3,298,156 | 1/1967 | Lerner . |
| 3,414,140 | 12/1968 | Feldkamp . |
| 3,462,027 | 8/1969 | Puckhaber . |
| 3,477,196 | 11/1969 | Lerner . |
| 3,523,055 | 8/1970 | Lemelson . |
| 3,575,757 | 4/1971 | Smith . |
| 3,575,781 | 4/1971 | Pezely . |
| 3,577,305 | 5/1971 | Hines et al. . |
| 3,616,155 | 10/1971 | Chavannes . |
| 3,650,877 | 3/1972 | Johnson . |
| 3,730,240 | 5/1973 | Presnick . |
| 3,808,981 | 5/1974 | Shaw . |
| 3,817,803 | 6/1974 | Horsley . |
| 3,837,990 | 9/1974 | McConnell et al. . |
| 3,837,991 | 9/1974 | Evans . |
| 3,938,298 | 2/1976 | Luhman et al. . |
| 3,939,995 | 2/1976 | Baxter . |
| 4,017,351 | 4/1977 | Larson et al. . |
| 4,040,526 | 8/1977 | Baxter et al. . |
| 4,044,693 | 8/1977 | Ramsey, Jr. . |
| 4,076,872 | 2/1978 | Lewicki et al. . |
| 4,096,306 | 6/1978 | Larson . |
| 4,102,364 | 7/1978 | Lowdermilk . |
| 4,146,069 | 3/1979 | Angarola et al. . |
| 4,201,029 | 5/1980 | Lerner . |
| 4,314,865 | 2/1982 | Ottaviano . |
| 4,354,004 | 10/1982 | Hughes et al. . |
| 4,518,654 | 5/1985 | Eichbauer et al. . |
| 4,564,407 | 1/1986 | Tsurata . |
| 4,576,669 | 3/1986 | Caputo . |
| 4,597,244 | 7/1986 | Pharo . |
| 4,619,635 | 10/1986 | Ottaviano . |
| 4,793,123 | 12/1988 | Pharo . |
| 4,874,093 | 10/1989 | Pharo . |
| 4,904,092 | 2/1990 | Campbell et al. . |
| 4,918,904 | 4/1990 | Pharo . |
| 4,931,033 | * 6/1990 | Leeds .................................. 493/239 |
| 5,117,608 | * 6/1992 | Nease et al. ...................... 53/385.1 |
| 5,188,691 | 2/1993 | Caputo . |
| 5,203,761 | 4/1993 | Reichental et al. . |
| 5,216,868 | 6/1993 | Cooper et al. . |
| 5,272,856 | * 12/1993 | Pharo ................................... 53/472 |
| 5,351,828 | * 10/1994 | Becker et al. ....................... 206/522 |
| 5,394,676 | 3/1995 | Lerner . |
| 5,470,300 | * 11/1995 | Terranova .......................... 493/239 |
| 5,552,003 | 9/1996 | Hoover et al. . |
| 5,693,163 | * 12/1997 | Hoover et al. ...................... 53/472 |

* cited by examiner

Primary Examiner—Stephen F. Gerrity
Assistant Examiner—Sam Tawfik
(74) Attorney, Agent, or Firm—Watts, Hoffmann, Fisher & Heinke Co., L.P.A.

(57) ABSTRACT

A process of forming dunnage is disclosed. A chain of interconnected plastic pouches are fed along a path of travel to a fill and seal station. The pouches are sequentially opened as each pouch is positioned in the fill station by directing a flow of air through a pouch fill opening to separate a face from a back of each such pouch and continuing the flow of air through each such opening to completely inflate each opened pouch. Each such inflated pouch is then sealed to create hermetically closed and inflated dunnage units. Novel web and dunnage units are also disclosed.

17 Claims, 3 Drawing Sheets

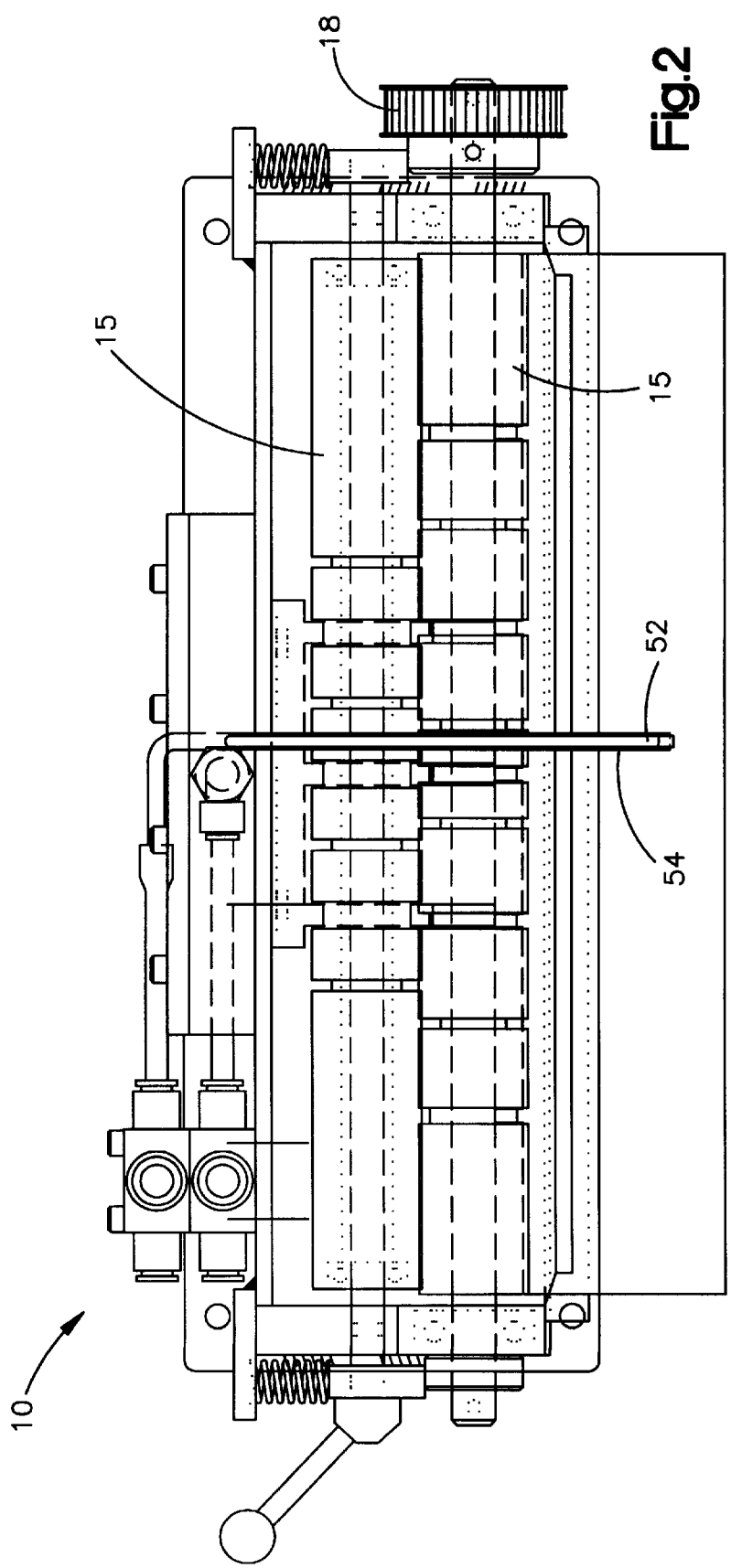

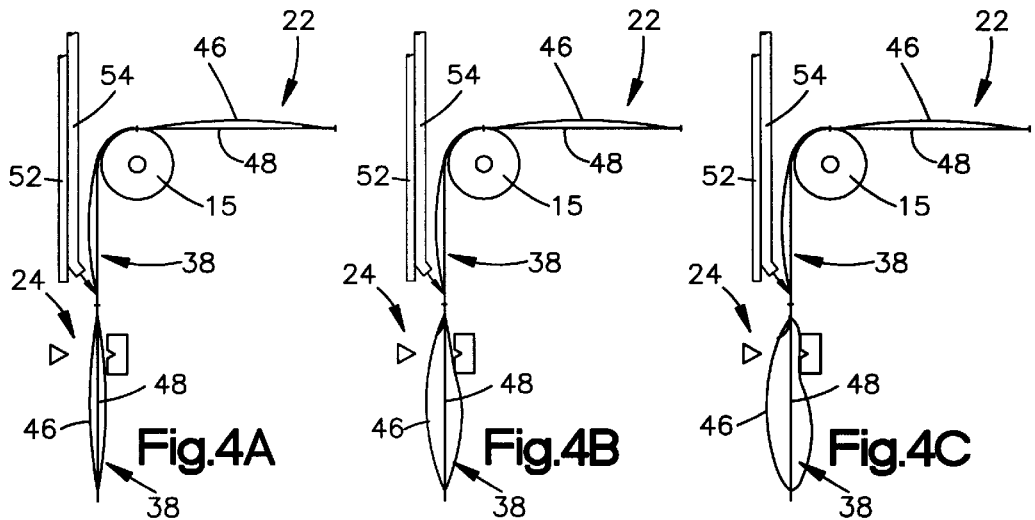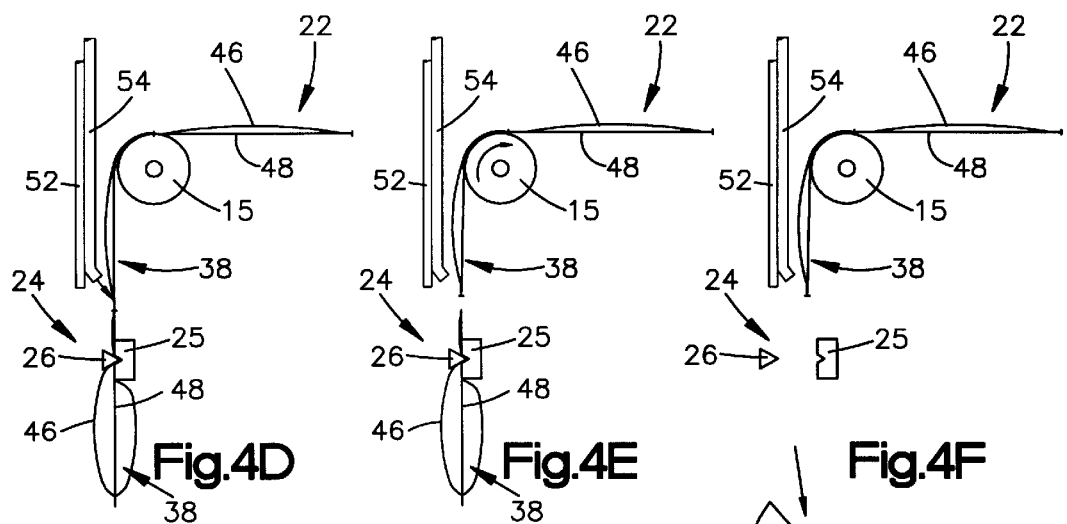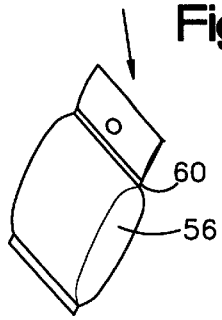

DUNNAGE MATERIAL AND PROCESS

This invention relates to dunnage and more particularly to a novel and improved web of interconnected dunnage pouches and a process of producing dunnage with such a web.

BACKGROUND OF THE INVENTION

U.S. Pat. Nos. 5,552,003 and 5,693,163 respectively entitled "Method for Producing Inflated Dunnage" and "Inflated Dunnage and Method for Its Production" and respectively issued Sep. 3, 1996 and Dec. 2, 1997 to Gregory A. Hoover et al. (the Dunnage Patents) disclose a method for producing dunnage utilizing preopened bags on a roll. The preopened bags utilized in the Dunnage Patents are of a type disclosed in U.S. Pat. No. 3,254,828 issued Jun. 2, 1966 to Hershey Lerner and entitled "Flexible Container Strips" (the "Autobag Patent"). The preferred bags of the Dunnage Patents are unique in that the so called tack of outer bag surfaces is greater than the tack of the inner surfaces to facilitate bag opening while producing dunnage units which stick to one another when in use.

SUMMARY OF THE INVENTION

The present invention enhances the production of dunnage with a system which is an improvement over the process disclosed in the Dunnage Patents. Specifically, with the present invention a web in the form of a chain of interconnected pouches is provided. Each of the pouches is closed other than for a small fill opening in the form of a cut out in its face. Thus, the pouches contrast with bags slit across a top portion as is the case with the Dunnage Patents and the chains of bags taught in the Autobag Patent.

The use of small fill openings obviates a problem that exists with the approach taught by the Dunnage Patents. Specifically, if either the face or back of a bag as used in the Dunnage Patents is uneven, such as by wrinkling, a seal will not be fully hermetic and air will leak from the dunnage unit. With the pouches of the present invention consistent hermetic seals are produced and air leakage from dunnage units is avoided.

In producing dunnage with the improved chain of pouches, a bagging machine of the type disclosed and claimed in U.S. Pat. No. 5,394,676 issued Mar. 7, 1995 to Bernard Lerner et al. under the title "Packaging Machine and Method" (the "Excel Patent") is utilized. The machine is modified to provide an air nozzle which emits a continuous flow of air during a dunnage formation portion of a cycle. The continuous flow of air is directed at the small, preferably circular, opening of a pouch positioned at a fill station. The continuous air flow is from a nozzle having an outlet complementally contoured to the pouch opening and preferably aligned such that the axis of the constantly flowing air intersects the web slightly above an opening of a pouch being inflated. The intersection of the axis is at an obtuse angle as measured outwardly of the machine. The flow is diverted downwardly by the web to pass through the opening of the pouch being inflated.

Once the constant flow of air has inflated a pouch, the flow is continued until a heat sealer has closed on the inflated pouch to effect a seal closing the pouch in an inflated condition to trap the inflation air in the pouch. Thus, an hermetic closure is formed between front and back layers of the pouch such that the hermetic closure surrounds the space. The hermetic closure consists of side folds or seals and a bottom seal formed as the chain of pouches is produced and the closure seal effected after the bag has been inflated.

Accordingly, the objects of the invention are to provide a novel and improved chain of interconnected pouches, a process of producing dunnage units with those pouches and novel and improved dunnage units.

BRIEF DESCRIPTION OF THE DRAWINGS

FIG. 2 is an elevational view of the machine's fill station;

FIGS. 4A–F are a schematic sequential showing of the dunnage formation process of the present invention.

DETAILED DESCRIPTION OF THE DRAWINGS

Figure 1:
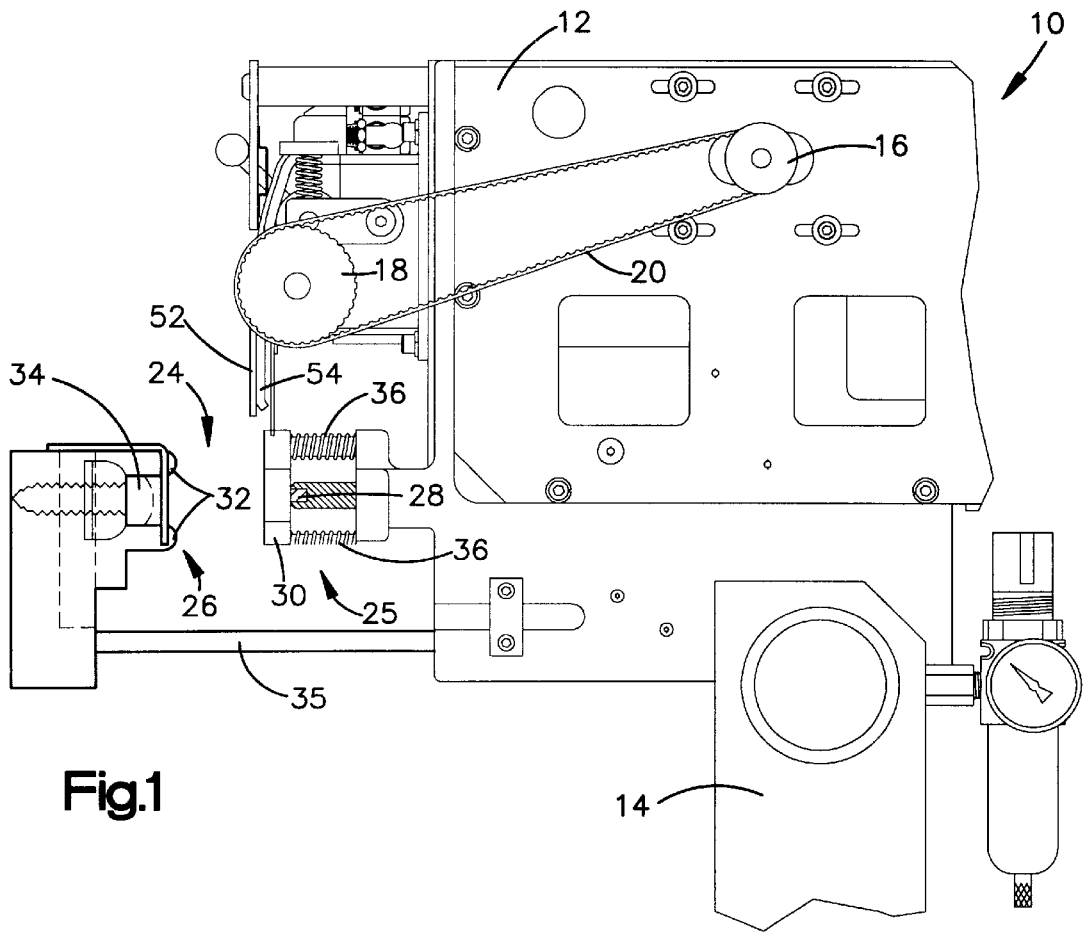
FIG. 1 is a fragmentary side elevational view of the machine of the Excel Patent modified in accordance with the present invention.

FIGS. 1 and 2 correspond respectively to FIGS. 2A and 7 of the Excel Patent modified to embody features to enable practice of the method of the present invention. The present disclosure of the machine of the Excel Patent will be limited to that portion of the machine which enables practice of the present invention. For a complete description of the entire machine of the Excel Patent, we hereby incorporate the Excel Patent by reference.

Referring to the drawings and to FIG. 1 in particular, a fragmentary section of the machine of the Excel Patent is shown generally at 10. The machine includes a section 12 known as a bagger which is mounted on a support post 14.

The bagger 12 includes a pair of oppositely rotatable feed rolls 15, FIG. 2. Feed roll drive is accomplished through a motor not shown which is operatively connected to a drive wheel 16. The drive wheel 16 in turn drives a feed roll drive wheel 18 via a belt 20. The drive wheels are intermittently rotated to feed a web 22 through the machine and outwardly and downwardly to an inflation or fill and seal station shown generally at 24.

A web sealer is provided that includes sealer and pressure pad subassemblies 25,26. The sealer subassembly includes a fixedly mounted heat element 28 and a spring biased protective plate 30. The pressure pad subassembly includes a pair of projections 32 and a sealer pad 34. The pressure pad subassembly 26 is mounted on a pair of reciprocatable rods 35, one of which is shown in FIG. 1. The rods in turn are connected to a suitable drive such as a cylinder which, on energization, will shift the sealer pad subassembly to the right as viewed in FIG. 1 until the projections 32 clamp an inflated pouch against the protective plate 30. Further travel of the rods press the protective plate against the action of springs 36 until a portion of the web 22 to be sealed is clamped between the heater bar 28 and the pressure pad 24 whereupon a seal is effected.

Figure 3:
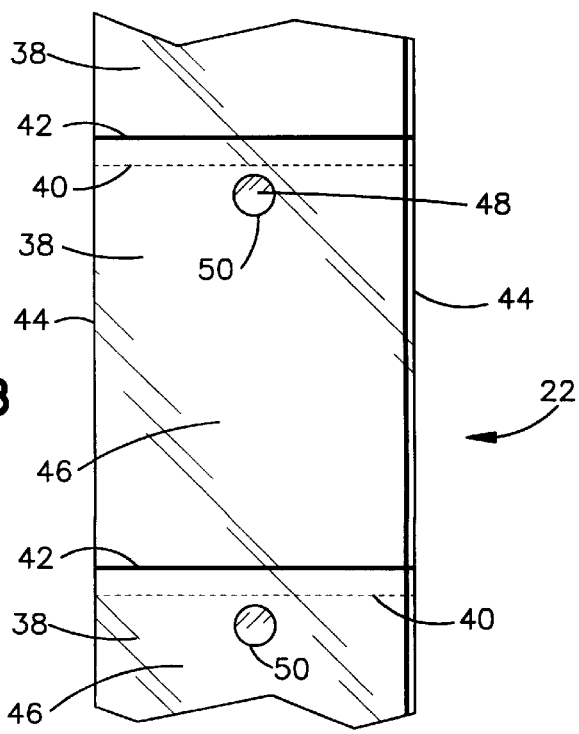
FIG. 3 is an elevational view of a section of the web of this invention.

The web 22 is best shown in FIG. 3. The web is a flattened plastic tube which includes a series of interconnected pouches 38 with adjacent pouches being joined together by lines of weakness in the form of perforations 40. Thus, the lines of weakness delineate the ends of the interconnected pouches and facilitate the subsequent separation of the web into dunnage units.

Each pouch 38 has a bottom delineated by an endless bottom seal 42. The spaced sides 44 are delineated by either folds or seals, such that for each pouch the bottom seal and sides together form three sides of a continuous hermetic seal about a fillable space delineated by faces 46 and backs 48 of the pouches. Each pouch face has a preferably circular fill opening 50 formed midway between the sides 44 and as close as practical to the bottom seal 42 of the next pouch in the web to maximize the size of the fillable space in the pouch. Thus each opening 50 is close to or into the line of weakness 40 delineating the top of that pouch.

In order to avoid wrinkles and resultant leaky dunnage units, each fill opening 50 has a transverse dimension of the order one fourth of or twenty-five percent of the width of the web or less. The longitudinal dimension of each fill opening as measured along the length of the web should be at least ½ the transverse dimension of the same fill opening as measured across the web.

The web 22 is formed of a heat sealable plastic, preferably polyethylene. While the present process can be effected with a plain polyethylene material, it is preferable that inner surfaces of the faces and backs 46,48 have relatively low tack to enable quick and reliable opening of each pouch as it is positioned at the fill station. Preferably, the outer surfaces have a tack greater than the inner surfaces. It is necessary that the outer surfaces are of sufficient tackiness to cause the dunnage units to stick together sufficiently to resist relative movement when protecting a packaged object. The differences in tack between the inner and outer surfaces are achieved by forming the web from either a coextruded film or a film which has a coating of a tack different than the tack of the film which it coats.

While the currently preferred machine does not have it, the machine may have the usual intermittent air nozzle 52 which at an appropriate time in a machine cycle emits a puff of air to separate the face 46 from the back 48 of a pouch 38 registered at the fill station 24. Whether the intermittent nozzle 52 is present or not, a relatively large fill nozzle 54 is provided. The fill nozzle is provided for formation of dunnage units according to the present invention and as such is an addition to the machine of Excel Patent. With the preferred circular fill openings 50 a fill nozzle with a circular outlet is preferred. Thus, it is desirable to have complementary contour nozzle outlets and fill openings.

Tests were conducted with a fill nozzle having a circular outlet opening ¼ inch in diameter. The fill nozzle was consistently effective in inflating pouches having circular fill openings ⅜ inch in diameter. Thus, tests have shown that a fill nozzle having an inside diameter of the order of ⅔ the diameter of the fill openings 50 produces outstanding results. In the tests, and as disclosed here, an extension of the axis of the fill nozzle 54 intersects the web slightly above and vertically aligned with the center of a fill opening of a load station positioned pouch. The intersection of the air flow with the web is at an obtuse angle as measured from the front of the machine.

Operation

In operation, the motor which drives the drive wheel 16 is energized to advance the web 22 until one of the pouches 38 is registered at the fill station as indicated schematically in FIG. 4A. With the described web and the machine of the Excel Patent, this registration is accomplished through the use of a spark gap detector. When one of the lines of weakness 40 passes between electrodes of a spark gap detector, a spark passes between the electrodes resulting in a signal which stops the web feed.

Once a pouch is located at the fill station, if the machine is equipped with an intermittent nozzle 52, a puff of air through the intermittent nozzle 52 against the fill opening 50 separates the face 46 from the back 48 of the registered pouch, FIG. 4B. When the machine is equipped with an intermittent nozzle, following pouch opening, a continuous flow of air from fill nozzle 54 is initiated and directed through the now aligned opening 50 of the pouch until it reaches a fully inflated condition shown in FIG. 4C. In the preferred arrangement, a positioned pouch is both opened and filled by a flow of air from the fill nozzle 54. The flow of fill air is directed against the web at a location longitudinally aligned with the fill opening of a pouch registered in the fill and seal station. The air flows downwardly along the surface of the web and through the fill opening into the fillable space of the registered pouch.

Once the registered pouch has been fully inflated, the pressure pad subassembly 26 is shifted to the right as viewed in the drawings to effect a seal between the face and the back as depicted in FIG. 4D. Once the filled pouch is clamped between the projections 32 and the protective plate 30, the flow of air from the fill nozzle is terminated. The seal being effected is a transverse seal 60 extending from side to side to complete an hermetic seal surrounding the now filled fillable space within the pouch, such that the fill opening 50 no longer communicates with the fillable space within the pouch.

As a pouch is being sealed, the drive wheel 16 and the rolls 15 are counterrotated a short distance to separate the filled pouch from the web, FIG. 4E. On opening of the seal assembly, the filled pouch which is now a dunnage unit 56, is dropped from the machine as indicated in FIG. 4F. Optionally, two or more dunnage units will be formed before the separation operation, so that one can produce a chain of dunnage units of a predetermined selected length.

Each produced dunnage unit is a body formed from plastic film. The body defines an hermetically enclosed space filled with air. The body has an outer surface which is sufficiently tacky to adhere to a body of a like dunnage unit. The body of each unit is of generally rectangular configuration with a pair of lips projecting from one side of the body, the lips having been formed by one of the seals 60. One of the lips includes a cut out which formerly was one of the fill openings 50.

While a single web forming individual dunnage units has been described, it is fully within the scope of this invention to concurrently feed two or more webs and to provide as many fill nozzles 54 as there are webs. Moreover, it is possible to provide chains of dunnage units by separating the units from the web only after chains of the desired number of units have been formed. Thus, separation occurs every other sealing operation for chains of two, every third operation for chains of three and so on.

Although the invention has been described in its preferred form with a certain degree of particularity, it is understood that the present disclosure of the preferred form has been made only by way of example and that numerous changes in the details of construction, operation and the combination and arrangement of parts may be resorted to without departing from the spirit and the scope of the invention as hereinafter claimed.

What is claimed is:

1. A process of forming dunnage comprising:

a) feeding a chain of interconnected plastic pouches along a path of travel to an inflation station; wherein an external surfaces of the plastic pouches have greater slip resistance than inner surfaces of the pouches;

b) sequentially opening each of a plurality of pouches as each such pouch is at the inflation station by directing a flow of air through a small fill opening substantially transversely centered in a face of each pouch, the width of the fill opening being no more than 25 percent of the width of the pouch, the opening step being performed as to each pouch as it is positioned in the inflation station, thereby separating the face from a back of each such pouch;

c) directing a further flow of air through each such fill opening of each opened pouch to substantially completely inflate each opened pouch; and, d) sealing each such inflated pouch to close each such fill opening and thereby create hermetically closed and inflated dunnage units.

2. The process of claim 1, wherein the difference in slip resistance is achieved by forming the chain from coextruded film.

3. The process of claim 1, wherein the difference in slip resistance is achieved by forming the chain from coated film.

4. A process of forming dunnage comprising:

a) feeding a chain of interconnected plastic pouches along a path of travel to an inflation station;

b) sequentially opening each of a plurality of pouches as each such pouch is at the inflation station by directing a flow of air through a small fill opening substantially transversely centered in a face of each pouch, the width of the fill opening being no more than 25 percent of the width of the pouch, the opening step being performed as to each pouch as it is positioned in the inflation station, thereby separating the face from a back of each such pouch;

c) directing a further flow of air through each such fill opening of each opened pouch to substantially completely inflate each opened pouch; the steady flow being directed from an outlet having a cross sectional area of the order of ⅔ of the cross sectional area of the pouch fill openings; and, d) sealing each such inflated pouch to close each such fill opening and thereby create hermetically closed and inflated dunnage units.

5. The process of claim 4, wherein the outlet and the pouch fill openings have complemental perimetral configurations.

6. The process of claim 4, wherein the pouch fill openings are circular.

7. The process of claim 4, wherein an imaginary extension of an axis of the outlet is in a common imaginary plane with an axis of the fill opening of a pouch being inflated, the outlet axis being at an obtuse angle relative to a face of a pouch being filled during the inflation step.

8. The process of claim 4, wherein the outlet and the pouch openings have complemental perimetral configurations.

9. The process of claim 8, wherein the pouch openings are circular.

10. A process of forming dunnage comprising:

a) feeding a chain of interconnected plastic pouches along a path of travel to an inflation station;

b) sequentially opening each of a plurality of pouches as each such pouch is at the inflation station by directing a flow of air through a small fill opening substantially transversely centered in a face of each pouch, the width of the fill opening being no more than 25 percent of the width of the pouch, the opening step being performed as to each pouch as it is positioned in the inflation station, thereby separating the face from a back of each such pouch;

c) directing a further flow of air through each such fill opening of each opened pouch to substantially completely inflate each opened pouch;

d) sealing each such inflated pouch to close each such fill opening and thereby create hermetically closed and inflated dunnage units; and, e) the opening step being performed with a first nozzle and the puff of air is provided by another nozzle.

11. A process of creating dunnage elements comprising:

a) feeding a chain of interconnected pouches along a path of travel through a machine;

b) each of the pouches having a face and a relatively small fill opening near a top of the face and being hermetically closed at least along spaced sides and a bottom, each fill opening having a transverse dimension of no more than one fourth the width of the bag;

c) sequentially sensing each of a series of spaced registration indicia to stop the feeding of the chain and thereby sequentially register each of the pouches at a fill station;

d) opening each such registered pouch by directing a flow of air through the fill opening of the registered pouch to separate a face and a back of the registered pouch;

e) inflating and filling each open pouch with air by directing a further flow of air through the fill opening of the open pouch into a fill space;

f) sealing the face to the back of each inflated pouch to close off the fill opening of the inflated pouch and complete an hermetic closure around the fill space and thereby produce an inflated dunnage unit; and, g) the opening step being performed with a first nozzle and the steady flow of air being provided by another nozzle.

12. A process of creating dunnage elements comprising:

a) feeding a chain of interconnected pouches along a path of travel through a machine; wherein external surfaces of the pouches of the units have greater slip resistance than inner surfaces of the units;

b) each of the pouches having a face and a relatively small fill opening near a top of the face and being hermetically closed at least along spaced sides and a bottom, each fill opening having a transverse dimension of no more than one fourth the width of the bag;

c) sequentially sensing each of a series of spaced registration indicia to stop the feeding of the chain and thereby sequentially register each of the pouches at a fill station;

d) opening each such registered pouch by directing a flow of air through the fill opening of the registered pouch to separate a face and a back of the registered pouch;

e) inflating and filling each open pouch with air by directing a further flow of air through the fill opening of the open pouch into a fill space; and;

f) sealing the face to the back of each inflated pouch to close off the fill opening of the inflated pouch and complete an hermetic closure around the fill space and thereby produce an inflated dunnage unit.

13. The process of claim 12, wherein the difference in slip resistance is achieved by forming the chain from coextruded film.

14. The process of claim 12, wherein the difference in slip resistance is achieved by forming the chain from coated film.

15. A process of creating dunnage elements comprising:

a) feeding a chain of interconnected pouches along a path of travel through a machine;

b) each of the pouches having a face and a relatively small fill opening near a top of the face and being hermetically closed at least along spaced sides and a bottom, each fill opening having a transverse dimension of no more than one fourth the width of the bag;

c) sequentially sensing each of a series of spaced registration indicia to stop the feeding of the chain and thereby sequentially register each of the pouches at a fill station;

d) opening each such registered pouch by directing a flow of air through the fill opening of the registered pouch to separate a face and a back of the registered pouch;

e) inflating and filling each open pouch with air by directing a further flow of air through the fill opening of the open pouch into a fill space;

f) sealing the face to the back of each inflated pouch to close off the fill opening of the inflated pouch and complete an hermetic closure around the fill space and thereby produce an inflated dunnage unit; and, g) the further volume flow being directed from an outlet having a cross sectional area of the order of ⅔ of the cross sectional area of the pouch openings.

16. The process of claim 15, wherein the pouch openings are circular.

17. A process of creating dunnage elements comprising:

a) feeding a chain of interconnected pouches along a path of travel through a machine;

b) each of the pouches having a face and a relatively small fill opening near a top of the face and being hermetically closed at least along spaced sides and a bottom, each fill opening having a transverse dimension of no more than one fourth the width of the bag;

c) sequentially sensing each of a series of spaced registration indicia to stop the feeding of the chain and thereby sequentially register each of the pouches at a fill station;

d) opening each such registered pouch by directing a flow of air through the fill opening of the registered pouch to separate a face and a back of the registered pouch;

e) inflating and filling each open pouch with air by directing a further flow of air through the fill opening of the open pouch into a fill space;

f) sealing the face to the back of each inflated pouch to close off the fill opening of the inflated pouch and complete an hermetic closure around the fill space and thereby produce an inflated dunnage unit; and, g) an imaginary extension of an axis of the outlet being in a common imaginary plane with an axis of the fill opening of a pouch being inflated, the outlet axis being at an obtuse angle relative to the face of the pouch being inflated during the inflation step, the obtuse angle being measured in the direction of airflow and outwardly from the face of a pouch being filled.

* * * * *